Sept. 12, 1939.   H. J. LENTZ   2,172,562
VALVE GEAR FOR REVERSIBLE RECIPROCATING FLUID PRESSURE
ENGINES, ESPECIALLY FOR LOCOMOTIVES
Filed Feb. 25, 1938   5 Sheets-Sheet 3
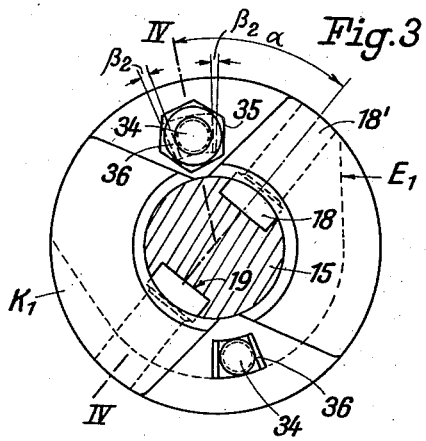
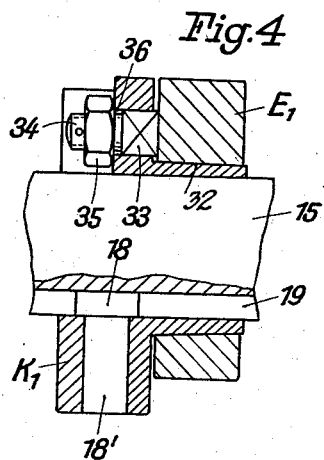
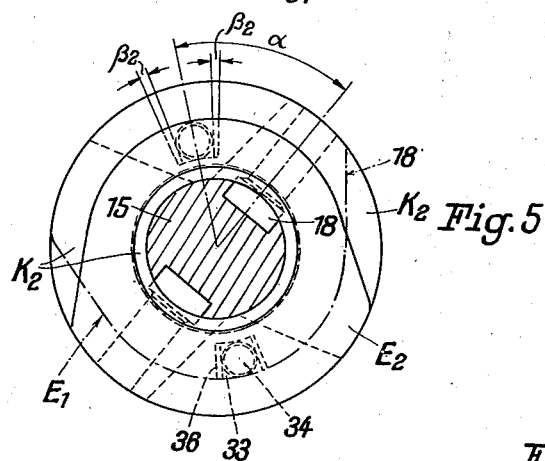
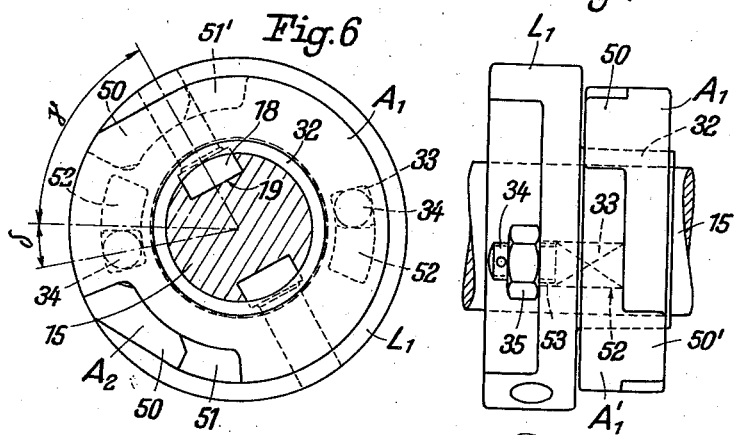
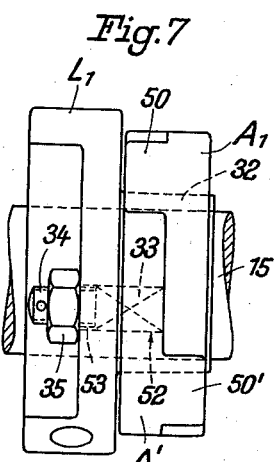
Inventor:

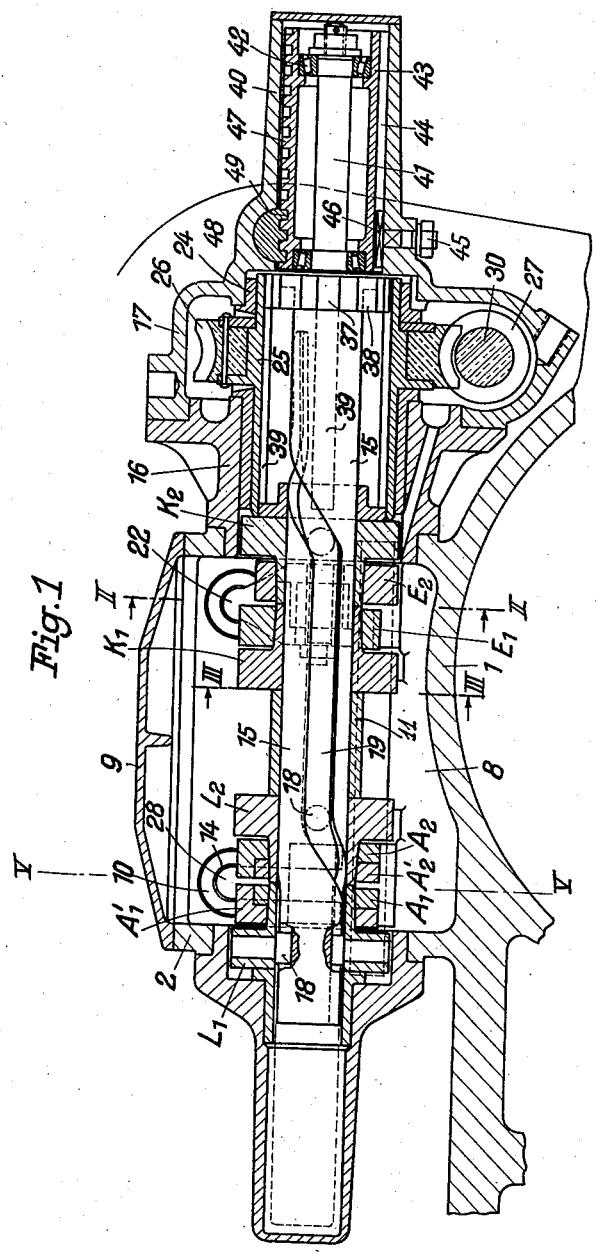

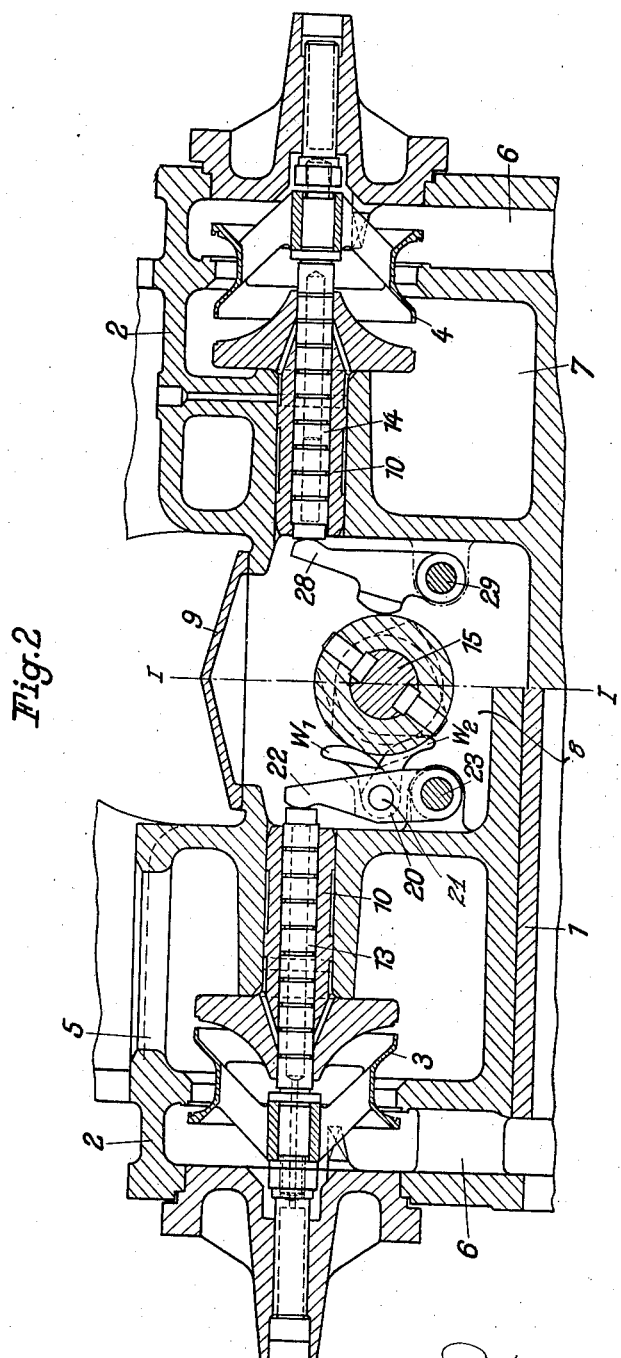

Sept. 12, 1939.    H. J. LENTZ    2,172,562
VALVE GEAR FOR REVERSIBLE RECIPROCATING FLUID PRESSURE
ENGINES, ESPECIALLY FOR LOCOMOTIVES
Filed Feb. 25, 1938    5 Sheets-Sheet 4
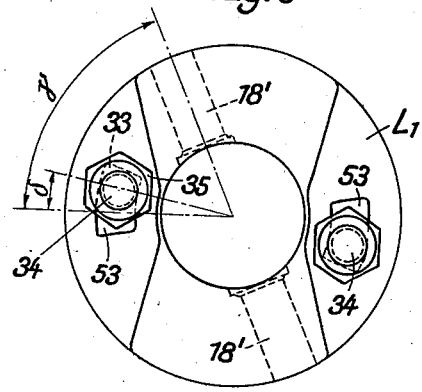
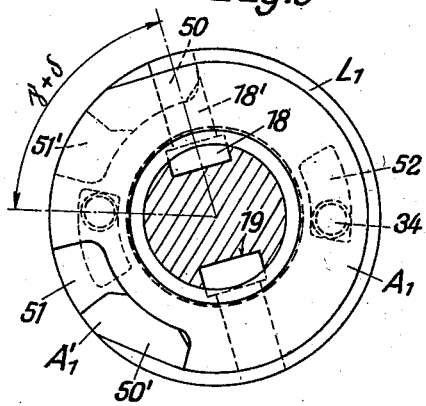
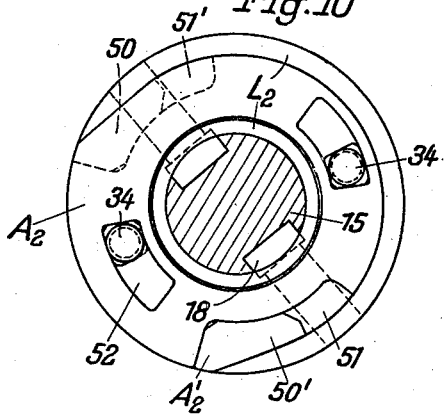
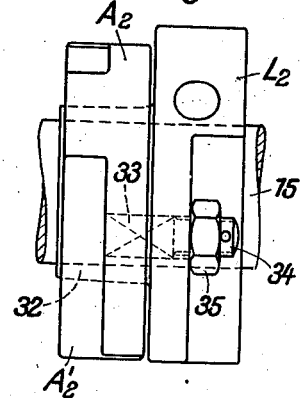
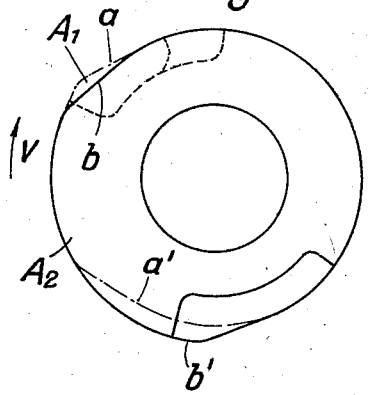
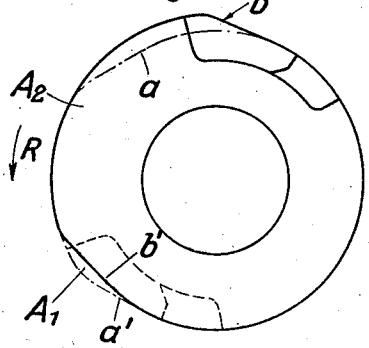
Inventor:

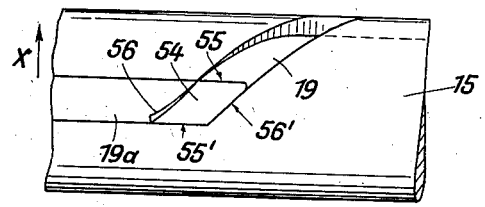
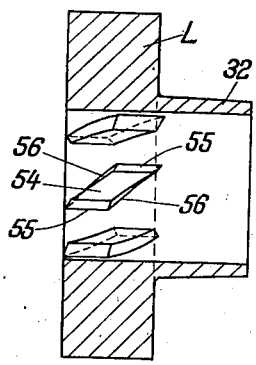
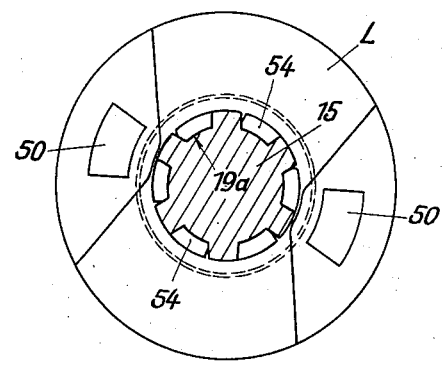
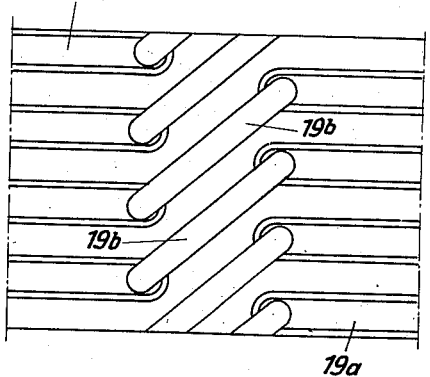

Patented Sept. 12, 1939

2,172,562

UNITED STATES PATENT OFFICE 2,172,562

VALVE GEAR FOR REVERSIBLE RECIPROCATING FLUID PRESSURE ENGINES, ESPECIALLY FOR LOCOMOTIVES

Hugo Johannes Lentz, Vienna, Austria

Application February 25, 1938, Serial No. 192,614
In Great Britain September 20, 1937

8 Claims. (Cl. 121—127)

The invention relates to a special construction of a valve gear for reversible fluid pressure engines especially for locomotives wherein the valves are actuated by rotary control cams and the adjustment of the control cams is effected by control grooves in the cam shaft said grooves extending partly in axial direction and are partly helical, coupling elements connected with the control cams engaging in said grooves to bring the control cams into the actually required position by which the cam shaft is axially shifted, as described in my patent application Serial No. 192,121 of February 23, 1938.

It is desirable and very advantageous to be able to set the initial position of the control cams independently of the law prescribed by the shape of the control grooves and to thus displace the position of the points of control so that the most favorable steam distribution is obtained for the type of engine in question. For this purpose the control cams are adjustable in their angular position relatively to the coupling element engaging in the control groove of the cam shaft by means of a manually adjustable clutch. The clutch, which may be of any suitable construction, establishes a rigid connection between the cam and the part which carries the coupling element engaging and guided in the control groove.

To enable the control points, determining the exhaust lead and the compression, to be adjusted within wide limits, two different cams are further provided according to the invention for controlling the exhaust valves, one of these cams regulating only the exhaust lead and the other only the compression for both directions of rotation. Both cams are so dimensioned and mutually displaced, that the side of the exhaust lead-cam moving in advance in the direction of rotation opens the exhaust valve, whereas the side of the compression cam lagging behind again closes the exhaust valve. Therefore, one side of each cam is only operative for one direction of rotation, whereas the other side is covered by the other cam and consequently inoperative. When the direction of rotation is changed the sides of the cams which were previously operative are covered and therefore inoperative, whereas those sides which were formerly covered now effect the opening and closing of the valve. Thus it is possible to render adjustable for each direction of rotation the corresponding controlling side independently of its other side, this being effected thereby that each of these two cams consists of two halves which are relatively adjustable and allow of a relative displacement of the controlling faces of each cam. The displacement of the cams or of the bearing bodies carrying them is effected by coupling elements mounted on these bodies and engaging into the catch grooves in the cam shaft. As each control groove is composed partly of axially directed and partly of helically curved portions these coupling elements were up to the present constructed as rollers. However, this is open to the disadvantage that there is only line-contact between roller and control groove.

This invention represents a further important improvement of the cam drive in that the coupling elements are constructed as rhomb-shaped prisms, mounted on the bearing bodies, of which two opposite side faces are flat and adapt themselves to the sides of the straight cam grooves, whereas the two other opposite faces are helically curved and fit in the helically curved portion of the control grooves. Therefore, there is always a surface-contact between the coupling elements and the cam shaft in all positions this surface contact enabling a frictionless and reliable transmission of power from the cam shaft to the cams and also ensures perfect guiding.

The invention also relates to means for enabling an axial displacement of the cam shaft.

An embodiment of the invention is illustrated in the accompanying drawings, in which:

Fig. 1 is a cross section on line I—I of Fig. 2 through the upper portion of the steam cylinder in the direction of the cam shaft mounted transversely therein.

Fig. 2 is a longitudinal section through the upper part of the cylinder, the left half being a section on line II—II of Fig. 1 viewed in the direction of the admission valve spindle and the right half a section on line V—V of Fig. 1 in the direction of the exhaust valve spindle.

Fig. 3 shows in end view one of the admission cams (admission lead cams) with its bearing body viewed in the direction of the arrow at section line III—III of Fig. 1.

Fig. 4 is a longitudinal section through the admission cam and its bearing body taken on line IV—IV of Fig. 3.

Fig. 5 shows the other admission cam (cut-off cam) viewed in the direction of the arrow on line II—II of Fig. 1.

Fig. 6 is an end view of the exhaust lead cam whereas

Fig. 7 is a side elevational view of the same cam.

Fig. 8 shows the corresponding bearing body in end view.

Fig. 9 is a similar view of the exhaust lead cam to that shown in Fig. 6 only with the difference that the lifting faces are moved further apart.

Fig. 10 shows the compression cam in end view.

Fig. 11 is a side elevation of Fig. 10.

Fig. 12 shows the relative positions of the exhaust lead and compression cams during running forwards and Fig. 13 their position during running backwards.

Fig. 14 shows in elevation a portion of the cam shaft with control groove and a prismatic coupling element engaging therein.

Fig. 15 is a longitudinal section through a bearing body for the cams with rhomb-shaped guide prisms distributed on their inner circumference.

Fig. 16 is an end view of Fig. 15.

Fig. 17 shows in part developed state the cam shaft with the control grooves milled therein.

I designates the cylinder of the steam engine with gear boxes mounted on its ends and accommodating the steam passages for the steam admission and exhaust and the control valves. In the middle of the gear box and transversely thereto is the cam shaft 15 with the admission and exhaust cams arranged thereon. On each side of the cam shaft an admission valve 3 and an exhaust valve 4 are arranged in the gear boxes, their spindles 13 and 14 being parallel the one to the other and directed towards the cam shaft. One pair of valves controls the steam admission and exhaust on the front end of the cylinder and the other pair of valves the steam admission and exhaust at the rear end of the cylinder.

The live steam is fed through a flange 5 at each end of the cylinder to the admission valve there situated. When the admission valve 3 is open the steam passes into the cylinder in front of the piston through one of the passages 6 formed one in each end of the cylinder. When the exhaust valve at the other end of the cylinder is open the expanded steam on the corresponding side of the piston escapes through the passage 6 at this end of the cylinder into an exhaust steam chamber 7 to which the exhaust pipes are connected.

The control valves 3 and 4 are double seated valves. Their spindles 13 or 14 are journalled in insert bushes 10 pressed into bores in the gear box 2. The spindles have labyrinth grooves which form a packing for the spindles towards the cam chamber 8 situated between the gear boxes 2. A cam shaft 15 extends through the cam chest 8 which is closed by a cover 9 to render easily accessible the gear parts situated in the cam chest.

The cam chest accommodates cams $E_1$ and $E_2$ for actuating the admission valves 3 and cams $A_1$ and $A_2$ for actuating the exhaust valves 4. These cams are, however, not mounted directly on the shaft 15 but with the aid of conical seating on separate bearing bodies $K_1$, $K_2$ and $L_1$, $L_2$ respectively loosely slipped on the shaft 15. These bearing bodies carry coupling elements 18, which engage in control grooves 19 formed in the shaft 15. To prevent the bearing bodies from shifting in the chamber 8 the inner bearing bodies are held apart by a spacing ring 11 on shaft 15, whereas the outer bearings bear against bushes.

The admission valves are actuated by intermediate levers 22, oscillatable about an axle 23 in cam chest 8. A rocker 20 is oscillatable about a pin 21 on each of these intermediate levers and the curved arms $W_1$ and $W_2$ of the rocker contact like a rolling lever with the circumference of the cams $E_1$ and $E_2$.

The two admission cams $E_1$ and $E_2$ (Figs. 3 to 5) rest on a cone 32 of their respective bearing bodies $K_1$ or $K_2$. They carry each on their inner surface two diametrically opposite bolts 33 with screw threaded ends 34 and nuts 35. The bolts 33 are guided in slots 36 extending concentric to the axis and their centre lines are displaced relatively to those of the coupling elements 18 through an angle $\alpha$. The slot is of such a length that the bolts and consequently the cams $E_1$, $E_2$ can be shifted a short distance on their bearing bodies $K_1$, $K_2$ out of their central position in both directions, for example at the most through an angle $\beta/2$, independently of the displacement caused by the control groove. It is thus possible to adjust by hand the moment at which the advance inflow takes place within the necessary limits, the cam being secured in its adjusted position by tightening nut 35.

During forward running of the engine the admission cam $E_1$ controls the admission lead whereas the cam $E_2$ controls the cut-off. In order to indicate the relative positions of the two cams, the position of the admission lead cam $E_1$ is shown in dot-dash lines in Fig. 5. When the direction of rotation is reversed the function of the cams changes accordingly, so that the cam $E_2$ now controls the admission lead an the cam $E_1$ the cut-off.

Two cams $A_1$ and $A_2$ are provided for actuating the exhaust valves 4, the cam $A_1$ controlling only the exhaust lead and the cam $A_2$ only the compression. In order to increase by hand the width of these cams, measured in angles, and to thus change the commencement of the exhaust lead or the commencement of the compression, independently of the adjustment determined by the control groove 19, each of these cams is composed of two claw-shaped interengaging cam halves $A_1$ and $A_1'$ and $A_2$ and $A_2'$ which are relatively adjustable and fixed with conical seat on the cone 32 of their bearing bodies $L_1$ and $L_2$ respectively. Each of these cam halves has a nose 50 or 50', which fits in a corresponding recess 51', 51 of the other cam half. The recesses 51, 51' are so dimensioned that each of the two cam halves can be displaced through a certain angle $\delta$. The nose-shaped parts of both cam halves carry the operative faces of the cams. The operative faces consequently extend over the entire length of the cams, so that the intermediate lever 28 cooperating with the cam rests on its full width on the cam.

The intermediate levers 28 are oscillatably mounted on axles 29 in the cam chest 8, their free ends acting on the spindles of the exhaust valves.

The two cam halves are secured on the cones 32 of their corresponding bearing bodies $L_1$, $L_2$ in a similar manner to the admission valves. For this purpose bolts 33 with screw threaded portions 34 and nuts 35 are mounted on the outer cam halves $A_1$. The bolts are guided in suitable slots 52 in the inner cam halves $A_1'$ and in suitable slots 53 in the bearing bodies $L_1$, these slots allowing sufficient clearance to enable each cam half to be displaced through an angle $\delta$.

Figs. 6 and 7 show the admission lead cam constructed in the manner described in the position in which the operative faces of the cam cover the smallest angle range. By loosening the nuts 35 the two cam halves can, however, be relatively displaced so that the operative faces cover a larger angle range, as shown in Fig. 9.

The compression cam illustrated in Figs. 10 and 11 is subdivided into two cam halves $A_2$ and $A_2'$ in a similar manner to the exhaust lead cams, these halves being similarly constructed and fixed on their corresponding bearing bodies $L_2$ by similar means. Consequently, the operative faces of the cams can likewise be adjusted within an angle range 2δ.

The two exhaust cams viewed in axial direction are located one behind the other in the direction of rotation V (Fig. 12), so that the lifting face $a$ of cam $A_1$ determines the exhaust lead and the running off surface $b'$ of the cam $A_2$ the commencement of the compression. At the same time the running off face $b$ of cam $A_2$ and the lifting face $a'$ of cam $A_1$ are actually covered by the other cam and consequently are inoperative.

If the direction of rotation is in the opposite direction (Fig. 13) the cams are displaced by the control groove 19 so that the lifting face $a'$ of cam $A_1$ determines the opening of the exhaust valve and the running off face $b$ of cam $A_2$ the closing of the exhaust valve.

Apart from this adjustment determined by the shape of the control groove the faces $a$, $a'$ and $b$, $b'$ can be adjusted by hand in the manner above described and thereby the time for the commencement of the exhaust lead and of the compression for both directions of rotation can be adapted to the actual working requirements.

The individual cams receive the rotary motion from the cam shaft 15 as the coupling elements 18 engaging in the control groove 19 drive the bearing bodies of the individual cams. In the cams illustrated in Figs. 1 to 11 the coupling elements consist of cylindrical pins 18, the shanks 18' of which engage in bores in the bearing bodies. Coupling elements of such shape only have line contact with the control grooves i. e. produce high pressures and cause heavy wear.

In order to effectively overcome this objection rhomb-shaped prisms 54 (Figs. 14 to 16) are arranged on the bearing bodies. Two opposite side faces 55, 55' of the prisms are flat and adapt themselves to the flat side faces of the straight control groove 19a. The two other opposite side faces 56, 56' of the prisms are helically curved and adapt themselves to the helical shape of the control groove 19. Such a construction of the coupling elements allows displacement both in the straight and also in the helical control groove. In all positions it produces a surface-contact. At the same time several control grooves may be formed in the periphery of the cam shaft, in which engage the suitably distributed coupling elements 54 of the individual bearing bodies. Thus a light running adjusting arrangement almost free from wear is produced for the control cams.

The adjustment of the control cams, so that they give the desired cut-offs during running forwards and backwards is effected by axial displacement of the cam shaft 15. Consequently this shaft 15 is shiftably mounted in the cam chest 3 and the control grooves 19 in this shaft effect the adjustment of the different cams. The drive of the cam shaft 15 and the arrangement for its adjustment are, as shown in Fig. 1, preferably accommodated in a casing mounted on the side of the cam chest 3 and composed of two parts 16 and 17. A sleeve 25 is mounted in this casing through the intermediary of bearing bushes 24. A worm wheel 26 fixed on this sleeve 25 meshes with a second worm wheel 27 keyed on a short axle 30 journalled in the casing part 17 and driven by a rotating part of the locomotive.

For transmitting the rotary movement of the worm wheel 26 to the cam shaft 15 the shaft 15 has a collar 38 which has in its periphery four recesses 37 in which tooth-like projections 39 on the inner surface of sleeve 25 engage. These projections extend parallel to the cam shaft and maintain a coupling of this shaft with the driving wheel even when the cam shaft 15 is shifted towards the left for changing the cut-off and the direction of rotation.

The axial displacement of the cam shaft 15 is effected by a setting device arranged directly adjacent the collar 38. This device comprises a setting sleeve 43 in which a journal 41 forming an extension of cam shaft 15 is rotatably mounted in roller bearings 42 and which is secured against rotation by a longitudinal slot 44 with a prism 46 slidably engaging therein.

The setting sleeve 43 is flattened on the side opposite the longitudinal groove and has teeth 47 projecting obliquely to the axial direction. These teeth mesh with the teeth 49 of a rack 48 arranged parallel to the cylinder and shiftably mounted in a bore in casing part 17. A rod system not shown in the drawings is connected to this rack 48 and extends to the locomotive cab. When the rack 48 is pulled the sleeve 43 is shifted in its guide 40 towards the left and shifts the cam shaft so that the control groove 19 in the latter effects the adjustment of the cams $E_1$, $E_2$ and $A_1$, $A_2$ in the manner above described.

I claim:—

1. Valve gear for reversible fluid pressure engines especially for locomotives, comprising in combination a rotary cam shaft having in its periphery control grooves extending partly in axial direction and partly along a helical path, bearing bodies loosely mounted on said shaft, two admission valve control cams, and two exhaust valve control cams, each of said cams adjustably mounted on the cam shaft by means of a manually adjustable clutch, coupling elements on each of said clutch bodies engaging in the control grooves in said shaft, and means for axially shifting said shaft.

2. Valve gear as specified in claim 1, in which the bearing bodies have each a conical seat for carrying one of the control cams and slot guides, screw bolts on the control cams guided in said slots, and nuts on said bolts for clamping the cams in the actual position adjusted by hand, the length of said slot guides limiting the range of adjustment of the control cams.

3. Valve gear as specified in claim 1, in which each of the two exhaust cams comprises two interengaging and relatively adjustable claw-shaped halves for hand adjustment of the control points for the exhaust lead and for the commencement of the compression.

4. Valve gear as specified in claim 1, in which each of the two exhaust cams comprises two interengaging and relatively adjustable claw-shaped halves for hand adjustment of the control points for the exhaust lead and for the commencement of the compression, the operative faces on each cam half of the two exhaust cams being situated on the portion which engages over the other cam half.

5. Valve gear as specified in claim 1, in which each of the coupling elements between the cam shaft and the cams consists of a prism on the corresponding bearing body, two opposite side faces of the prism being flat and conforming with the sides of the axial control grooves, whereas the two other opposite sides of the prisms are curved in helical shape to fit the helical portions of the control grooves.

6. In a valve gear as specified in claim 1, a driving wheel coupled with one end of the cam shaft, an element for shifting said cam shaft arranged co-axially with said driving wheel, a cam chest accommodating said cams, and a casing extending directly from said cam chest accommodating said driving wheel and said element.

7. In a valve gear as specified in claim 1, a collar mounted on the cam shaft and having recesses in its periphery, a driving wheel coupled with one end of said shaft, a coupling sleeve carrying said wheel, and longitudinal ribs on said sleeve engaging in said recesses and maintaining the driving connection between said wheel and said cam shaft irrespectively of the axial displacement of said cam shaft.

8. In a valve gear as specified in claim 1, a journal formed on the end of the cam shaft, a setting sleeve secured against rotation on said journal, oblique teeth on said sleeve, and a rack arranged perpendicularly to said sleeve and meshing with said teeth.

HUGO JOHANNES LENTZ.